(12) United States Patent
Kogane et al.

(10) Patent No.: US 6,477,837 B2
(45) Date of Patent: *Nov. 12, 2002

(54) METHOD FOR OPERATING HYDRAULIC DRIVE APPARATUS

(75) Inventors: Tokiro Kogane, Nagano (JP); Satoru Tokida, Nagano (JP)

(73) Assignee: Nissei Plastics Industrial Co., Ltd., Nagono-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,531

(22) Filed: Feb. 22, 1999

(65) Prior Publication Data

US 2002/0053204 A1 May 9, 2002

(30) Foreign Application Priority Data

Feb. 25, 1998 (JP) .............................. 10-043667

(51) Int. Cl.$^7$ ................................ F04B 49/00
(52) U.S. Cl. ........................... 60/428; 60/486
(58) Field of Search ................... 60/327, 421, 428, 60/486

(56) References Cited

FOREIGN PATENT DOCUMENTS

| JP | 4-103324 | * | 4/1992 |
| JP | 792061 | | 10/1995 |

* cited by examiner

Primary Examiner—Edward K. Look
Assistant Examiner—Thomas E. Lazo
(74) Attorney, Agent, or Firm—Birch, Stewart, Kolasch & Birch, LLP

(57) ABSTRACT

A method for operating a hydraulic drive apparatus in which flows of oil discharged from a plurality of hydraulic drive sources each using a hydraulic pump are merged in order to drive an actuator. At least in a pressure control mode, one of the hydraulic drive sources (main hydraulic drive source) is operated in a regular manner, and the other hydraulic drive source (auxiliary hydraulic drive source) is operated such that at A merge point where the oil flows merge, the pressure of oil from the auxiliary hydraulic drive source becomes lower than the pressure of oil from the main hydraulic drive by a predetermined amount. Thus, an ordinary pressure control signal is applied to the main hydraulic drive to perform an ordinary pressure control. However, through modification of the pressure control signal applied to the auxiliary hydraulic drive source and adjustment of a control valve, the pressure of oil from the auxiliary hydraulic drive source at the merge point becomes lower than the pressure of oil from the main hydraulic drive source at the merge point by a predetermined amount, so that pressure oscillation phenomenon (resonance phenomenon) is prevented.

7 Claims, 2 Drawing Sheets

METHOD FOR OPERATING HYDRAULIC DRIVE APPARATUS

BACKGROUND OF THE INVENTION

1. Field of the Invention

The present invention relates to a method for operating a hydraulic drive apparatus in which flows of pressurized oil discharged from a plurality of hydraulic drive sources each utilizing a hydraulic pump are merged in order to drive an actuator.

2. Description of the Related Art

A conventional hydraulic drive apparatus built into a large-sized injection molding machine is disclosed in, for example, Japanese Patent Publication (kokoku) No. 7(1995)-92061. In the hydraulic drive apparatus, in order to avoid an increase in cost stemming from employment of a single, large hydraulic drive source, a plurality of hydraulic drive sources are connected in parallel in order to merge the flows of pressurized oil discharged from the respective hydraulic drive sources, to thereby secure a large flow rate. The hydraulic drive sources generally have an identical circuit configuration, including a hydraulic pump.

In a speed control mode, a speed control signal determined on the basis of a speed command value is simultaneously supplied to the respective hydraulic drive sources, so that pressurized fluid is supplied from the hydraulic drive sources to various kinds of actuators such as hydraulic cylinders built into an injection apparatus and a clamping apparatus, and the speeds of the actuators are controlled by means of feedback control. In this case, the hydraulic drive sources discharge pressurized oil at the same flow rate. In a pressure control mode, a pressure control signal determined on the basis of a pressure command value is simultaneously supplied to the respective hydraulic drive sources, so that pressurized fluid is supplied from the hydraulic drive sources to the actuators, and the pressure of oil supplied to the actuators is controlled by means of feedback control.

However, the above-described conventional hydraulic drive apparatus has the following problem. In the pressure control mode, a pressure control signal is simultaneously supplied to the plurality of hydraulic drive sources of identical structure, and the pressure of discharged oil is controlled through feedback control in a state in which the flow rate is nearly zero. This control state causes pressure oscillation phenomenon (resonance phenomenon), resulting in impairment of operation stability. Therefore, pressure control cannot be performed with a high degree of accuracy and a high degree of reproducibility.

SUMMARY OF THE INVENTION

An object of the present invention is to provide a method for operating a hydraulic drive apparatus which secures stable operation and enables pressure control with a high degree of accuracy and a high degree of reproducibility, through reliable prevention of a pressure oscillation phenomenon which would otherwise occur when a plurality of hydraulic drive sources are connected in parallel.

Another object of the present invention is to provide a method for operating a hydraulic drive apparatus which can be performed through adjustment of existing components and can obviate necessity for additional parts and structures, thereby enabling the method to be performed easily and at low cost.

To achieve the above-described objects, the present invention provides a method for operating a hydraulic drive apparatus in which flows of oil discharged from a plurality of hydraulic drive sources each using a hydraulic pump are merged in order to drive an actuator, wherein at least in a pressure control mode, one of the hydraulic drive sources (main hydraulic drive source) is operated in a regular manner, and the other hydraulic drive source (auxiliary hydraulic drive source) is operated such that at a merge point where the oil flows merge, the pressure of oil from the auxiliary hydraulic drive source becomes lower than the pressure of oil from the main hydraulic drive by a predetermined amount. An ordinary pressure control signal is applied to the main hydraulic drive to perform an ordinary pressure control. However, through modification of the pressure control signal applied to the auxiliary hydraulic drive source and adjustment of a control valve, the pressure of oil from the auxiliary hydraulic drive source at the merge point becomes lower than the pressure of oil from the main hydraulic drive source at the merge point by a predetermined amount, so that pressure oscillation phenomenon (resonance phenomenon) is prevented.

DETAILED DESCRIPTION OF THE PREFERRED EMBODIMENT

An embodiment of the present invention will now be described in detail with reference to the drawings. The accompanying drawings are illustrative of the embodiment and are not meant to limit the scope of the invention. For clarification of the invention, detailed description of known parts is omitted.

First, with reference to FIG. 2, there will be described the structure of a hydraulic drive apparatus 1 to which the operating method of the present embodiment cam be applied.

Figure 2:
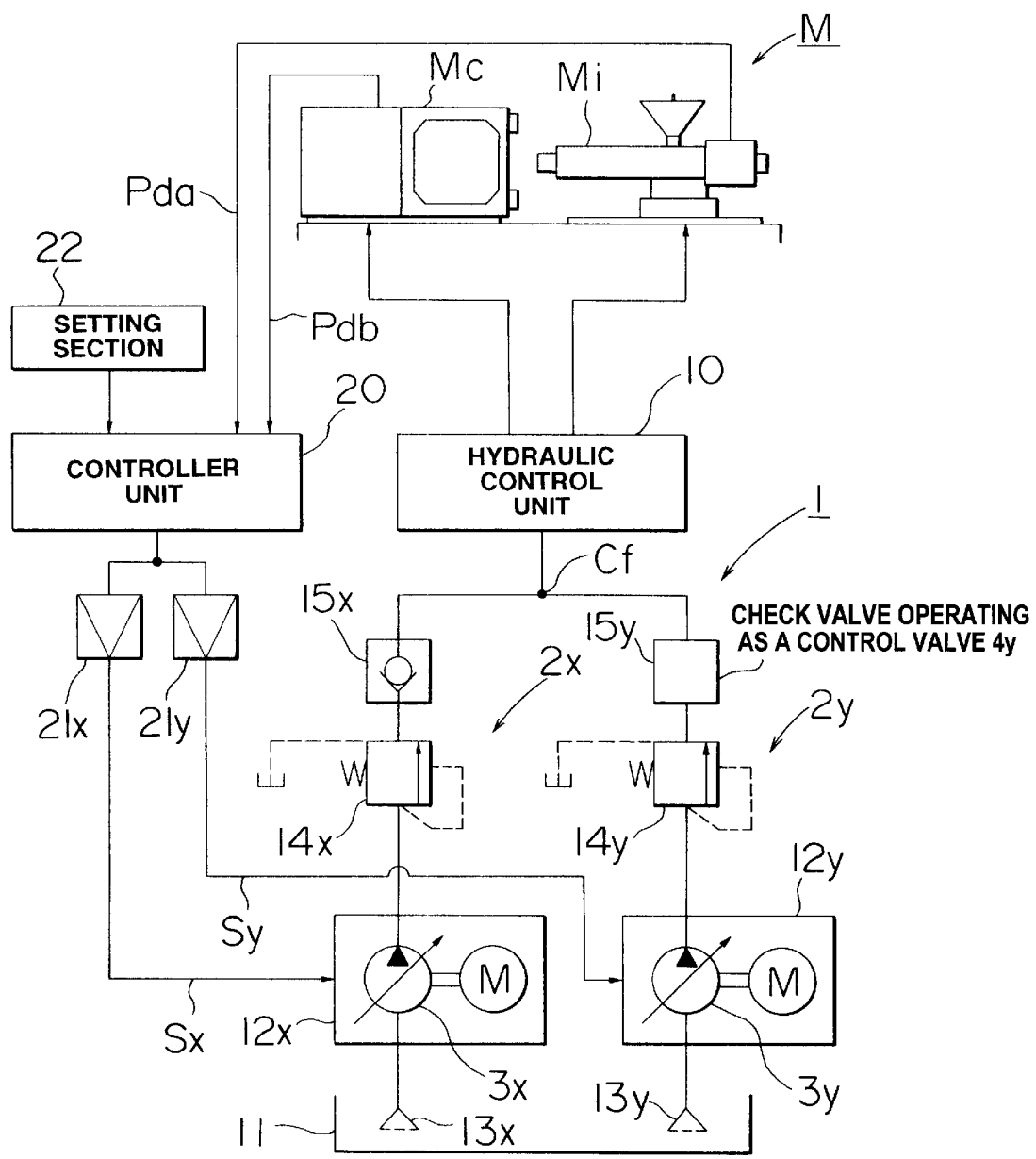
FIG. 2 is a diagram showing the structure of a hydraulic drive apparatus, including a hydraulic circuit, to which the operating method of the embodiment is applied.

In FIG. 2, reference symbol M denotes an injection molding machine body, which has an injection apparatus Mi and a clamping apparatus Mc, both of which include various actuators such as hydraulic cylinders. Numeral 1 denotes a hydraulic drive apparatus, which is connected, via a hydraulic control unit 10, to the actuators built into the injection apparatus Mi and the clamping apparatus Mc.

The hydraulic drive apparatus 1 includes two hydraulic drive sources 2x and 2y connected in parallel. In the present embodiment, the hydraulic drive source 2x serves as a main hydraulic drive source and the hydraulic drive source 2y serves as an auxiliary hydraulic drive source. The oil intake passages of the hydraulic drive sources 2x and 2y are connected to an oil tank 11, and the oil discharge passages of the hydraulic drive sources 2x and 2y are connected to an oil flow-in port of the hydraulic circuit unit 10 via a merge point Cf of a Y-shaped merge circuit.

The main hydraulic drive source 2x includes a hydraulic pump unit 12x containing a variable delivery pump 3x whose swash-plate angle is variably controlled in accordance with a pressure control signal Sx input to the hydraulic pump unit 12x. The intake port of the pump 3x is connected to the oil tank 11 via an oil filter 13x, and the discharge port of the pump 3x is connected to the merge point Cf via a series circuit including a sequence valve 14x and a check valve 15x. Meanwhile, the auxiliary hydraulic drive source 2y has a circuit configuration identical to that of the main hydraulic drive source 2x. In the auxiliary hydraulic drive source 2y, numeral 3y denotes a variable delivery pump; numeral 12y denotes a hydraulic pump unit; numeral 13y denotes an oil filter; numeral 14y denotes a sequence valve; numeral 15y denotes a check valve serving as a control valve 4y; and symbol Sy denotes a pressure control signal input to the hydraulic pump unit 12y.

Numeral 20 denotes a controller unit. Pressure detection values Pda and Pdb fed from the injection apparatus Mi and the clamping apparatus Mc are supplied to the input side of the controller unit 20, and the output side of the controller unit 20 is connected to the input sides of amplifiers 21x and 21y. The pressure control signals Sx and Sy output from the amplifiers 21x and 21y are supplied to the hydraulic pump units 12x and 12y. This configuration enables feedback control of pressure. Further, numeral 22 denotes a setting section connected to the controller unit 20. Various kinds of values such as pressure command values can be set through use of the setting section 22. FIG. 2 shows only the structure of a main portion of a pressure control system, and other portions such as a speed control system are omitted.

Figure 1:
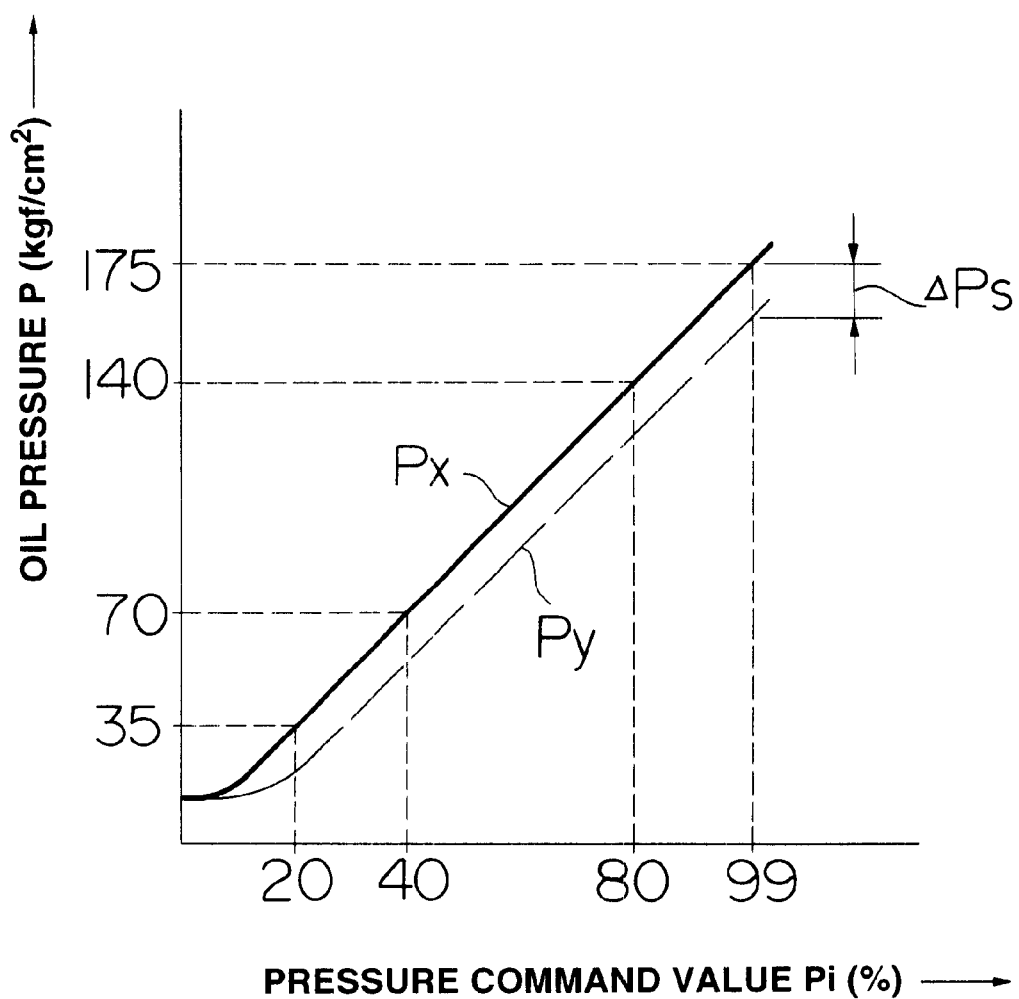
FIG. 1 is a pressure characteristic diagram of a hydraulic pump showing a relationship between pressure command value and oil pressure when a hydraulic drive apparatus is operated by an operating method according to an embodiment of the present invention.

Next, the method of operating the hydraulic drive apparatus 1 according to the present embodiment will be described with reference to FIGS. 1 and 2.

First, a presetting operation is performed such that when measured at the merge point Cf, the pressure of oil from the auxiliary hydraulic drive source 2y is lower than the pressure of oil from the main hydraulic drive source 2x by a predetermined amount. That is, the magnitude of the pressure control signal Sy supplied to the auxiliary hydraulic drive source 2y is changed to make the pressure of oil from the auxiliary hydraulic drive source 2y lower than that of oil from the main hydraulic drive source 2x by a predetermined amount. Further, the check valve 15y serving as a control valve 4y in the auxiliary hydraulic drive source 2y is adjusted in order to further decrease the pressure of oil from the auxiliary hydraulic drive source 2y.

Specific setting operation is as follows. When the magnitude of the pressure control signal Sy is changed, the amplifier 21y of the auxiliary hydraulic drive source 2y is turned off, and only the pump 3x of the main hydraulic drive source 2x is brought into a loaded state. In this state, regular pressure adjustment is performed. Simultaneously, the magnitude of the pressure control signal supplied from the controller unit 20 to the amplifier 21y of the auxiliary hydraulic drive source 2y is adjusted to become equal to that for the main hydraulic drive source 2x. Subsequently, the amplifier 21y of the auxiliary hydraulic drive source 2y is turned on. In this state, the gain and the like of the amplifier 21y of the auxiliary hydraulic drive source 2y are adjusted such that the auxiliary hydraulic drive source 2y has a pressure characteristic Py shown in FIG. 1, which represents the relationship between the supplied pressure command value Pi (%) and oil pressure (discharge pressure) P (kgf/cm$^2$). That is, the pressure characteristic Py is such that for a certain pressure command value, the oil pressure P according to the pressure characteristic Py becomes lower than the oil pressure P according to the pressure characteristic Px of the pump of the main hydraulic drive source 2x by a small pressure difference ΔPs (kgf/cm$^2$).

The pressure difference ΔPs (kgf/cm$^2$) is set to a few kgf/cm$^2$; for example, to about 5 to 8 kgf/cm$^2$. The pressure difference ΔPs can be determined experimentally. In an exemplary method, the pressure difference ΔPs is increased stepwise from zero, and a value of the pressure difference ΔPs at which pressure oscillation is stopped is obtained. Since the work value of the pump 3y of the auxiliary hydraulic drive source 2y becomes increasingly limited as the pressure difference ΔPs is increased, unnecessary increase of the pressure difference ΔPs is not preferred.

Further, the check valve 15y of the auxiliary hydraulic drive source 2y is adjusted such that the check valve 15y causes a pressure drop ΔPt (kgf/cm$^2$). The check valve 15y serving as a control valve 4y for making the pressure of oil from the auxiliary hydraulic drive source 2y at the merge point Cf lower than that of oil from the main hydraulic drive source 2x by a predetermined amount. The pressure drop ΔPt (kgf/cm$^2$) may be set to about a few kfg/cm$^2$. Although the above-described change of the pressure control signal Sy exerts influence in the pressure control mode only, the pressure drop at the check valve 15y exerts influence in both the pressure control mode and the speed control mode. Therefore, in the speed control mode the pressure drop becomes a useless loss. However, this loss is very small when viewed in consideration of the overall control system.

In the pressure control mode, the hydraulic drive apparatus 1 operates as follows. First, a pressure control signal Sx having an ordinary or regular magnitude is supplied to the main hydraulic drive source 2x. By contrast, a pressure control signal Sy having a modified magnitude is supplied to the auxiliary hydraulic drive source 2y. Further, the oil pressure is decreased by the check valve 15y serving as a control valve 4y. When measured at the merge point Cf, the pressure of oil discharged from the auxiliary hydraulic drive source 2y becomes lower than the pressure of oil discharged from the main hydraulic drive source 2x by a predetermined amount. As a result, only the oil pressure from the main hydraulic drive source 2x, which is operated in a regular manner, acts on the actuators built into the injection apparatus Mi and the clamping apparatus Mc, and the oil pressure from the main hydraulic drive source 2x does not affect the pressure of oil discharged from the auxiliary hydraulic drive source 2y, due to the function of the check valve 15y.

Accordingly, even when the hydraulic drive sources 2x and 2y are connected in parallel, occurrence of pressure oscillation phenomenon (resonance phenomenon) is prevented reliably, so that stable operation is secured. Therefore, pressure control can be performed with a high degree of accuracy and a high degree of reproducibility. In addition, since the operation method of the present invention can be performed through adjustment of existing components, additional parts and structures are not required, and the method can be performed easily and at low cost.

The present invention is not limited to the above-described embodiment. Regarding structural details, approaches, and the like, modifications and any omission or addition may be possible as needed without departing from the scope of the invention.

For example, the above-mentioned embodiment exemplifies a case in which the pressure of oil from the auxiliary hydraulic drive source 2y is made lower than that from the main hydraulic drive source 2x, through modification of the pressure control signal Sy supplied to the auxiliary hydraulic drive source 2y and through adjustment of the check valve 15y serving as a control valve 4y provided in the auxiliary hydraulic drive source 2y. However, a similar effect is obtained through selective employment of the method of modifying the pressure control signal Sy supplied to the auxiliary hydraulic drive source 2y and the method of adjusting the control valve 4y. Further, any other method may be used in order to make the pressure of oil from the auxiliary hydraulic drive source 2y lower than that from the main hydraulic drive source 2x. Further, although the above-mentioned embodiment exemplifies a case in which the present embodiment is applied to an injection molding machine, the present invention can be similarly applied to other types of machinery.

What is claimed is:

1. A method for operating a hydraulic drive apparatus comprising the steps of:

providing a first hydraulic drive source including a first hydraulic pump unit;

providing a second hydraulic drive source including a second hydraulic pump unit;

connecting a fluid output of the first hydraulic pump unit and a fluid output of the second hydraulic pump unit together at a merge point;

providing a control valve in series between the fluid output of the second hydraulic pump unit and the merge point; and supplying a pressure control signal to the second hydraulic drive source to make a pressure of fluid from the second hydraulic drive source at the merge point lower than that of a pressure of fluid from the first hydraulic drive source at the merge point;

supplying a pressure control signal to at least one amplifier.

2. The method according to claim 1, further comprising the step of adjusting the control valve in order to further decrease the pressure of fluid from the second hydraulic drive source.

3. The method according to claim 2, further comprising the step of controlling the control valve by a pressure control signal.

4. The method according to claim 1, further comprising the steps of providing a controller unit for supplying the pressure control signal.

5. The method according to claim 4, further comprising the step of:

providing a first pressure control signal to the first hydraulic drive source; and providing a second pressure control signal to the second hydraulic drive source.

6. The method according to claim 5, further comprising the step of providing the second pressure control signal includes the step of decreasing the pressure of fluid from the second hydraulic drive source.

7. The method according to claim 5, further comprising the step of providing a hydraulic control unit; and connecting the hydraulic control unit to the merge point.

* * * * *